United States Patent [19]

Kotecki et al.

[11] Patent Number: 4,839,499
[45] Date of Patent: Jun. 13, 1989

[54] SYSTEM FOR SUPPLYING POWER TO DIFFERENT CUTTING TORCHES

[75] Inventors: Mariusz B. Kotecki, San Diego; James M. Thommes, Escondido, both of Calif.

[73] Assignee: Cyclomatic Industries, Inc., San Diego, Calif.

[21] Appl. No.: 206,107

[22] Filed: Jun. 13, 1988

[51] Int. Cl.$^4$ .................................................. B23K 9/10
[52] U.S. Cl. ......................... 219/121.39; 219/121.54; 219/121.57; 219/130.1
[58] Field of Search ...................... 219/121.39, 121.54, 219/121.56, 121.57, 121.45, 130.1, 124.1, 74, 75; 324/73 R, 73 AT

[56] References Cited

U.S. PATENT DOCUMENTS 4,280,041 7/1981 Kiessling et al. ................ 219/121.54

Primary Examiner—M. H. Paschall
Attorney, Agent, or Firm—Majestic, Parsons, Siebert & Hsue

[57] ABSTRACT

The housing of the cutting torch power supply has an opening and a drawer which can be slid into and out of the opening. The back wall of the drawer carries a connector plug adapted for connection to the torch connectors and connections to a gas source, and a power source in the power supply. When the drawer extends out of the opening, the connector plug is accessible for changing connectors. The drawer may also be entirely removed from the housing so that the connector plug can be replaced. The above feature enables the power supply to be conveniently used for supplying power and gas to torches which have cables with different types of gas and power connectors. When the drawer is in a closed position, power is supplied to the torch. When the drawer is away from the closed position, a switch is activated to cut off power to the torch to prevent shock hazard. A number of voltage divider circuits are provided in a reference circuit for providing a reference signal to the power source for setting a current level for sustaining a pilot arc at the torch. Each voltage divider circuit has a resistance ratio which causes the current level set to be appropriate for supporting pilot arc at a particular type of torch. The operator can then select the appropriate voltage divider circuit for causing the power source to provide the desired current for sustaining a pilot arc at a torch which the operator intends to use. Such feature also enables the power supply to supply power to torches having different pilot current requirements.

3 Claims, 4 Drawing Sheets

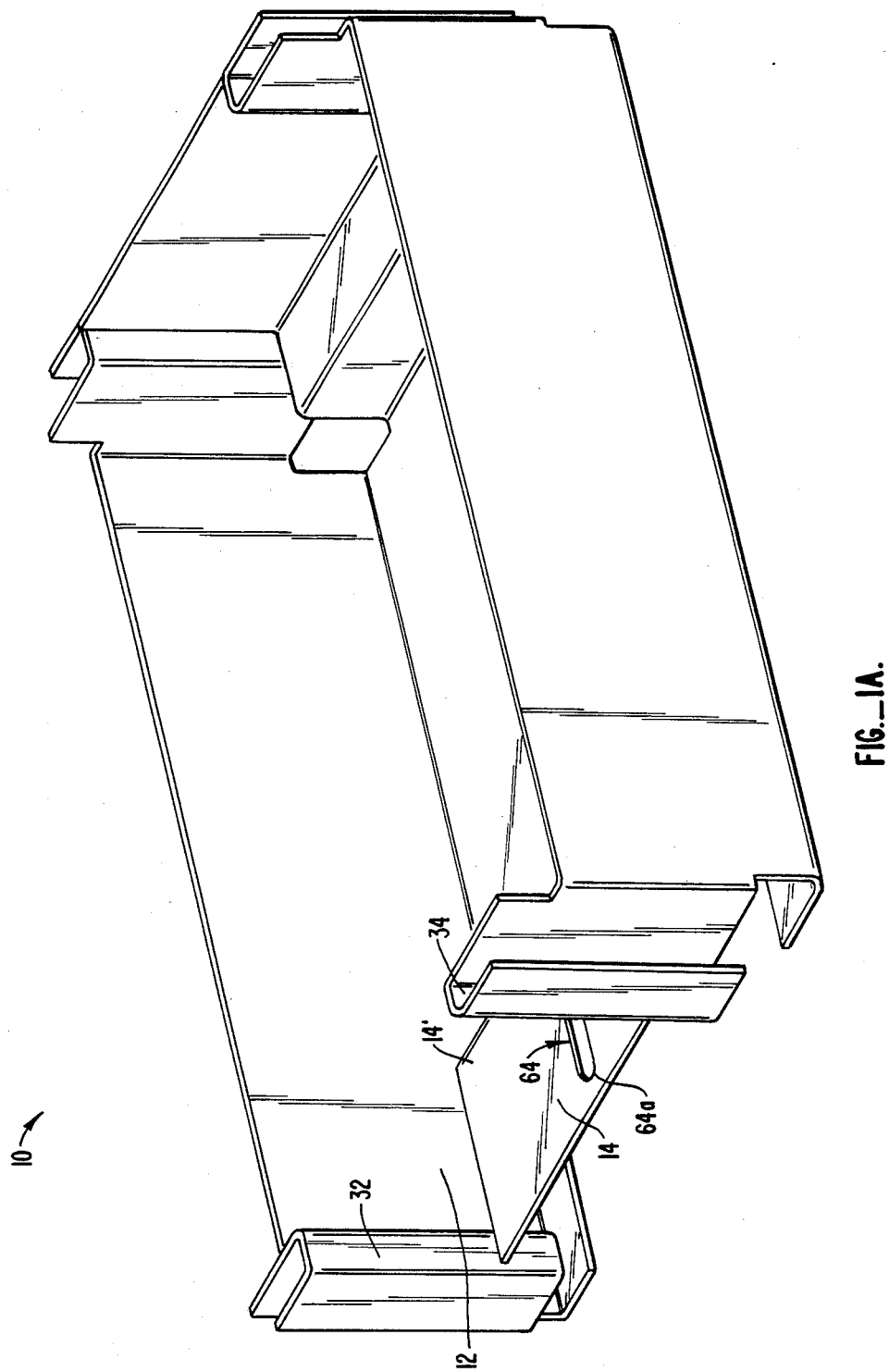
FIG._1A.

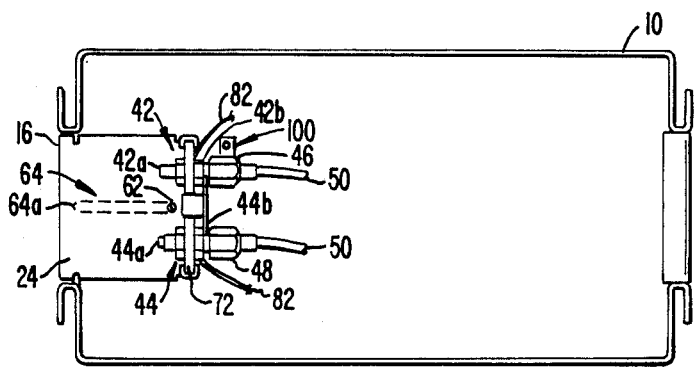
FIG._1B.
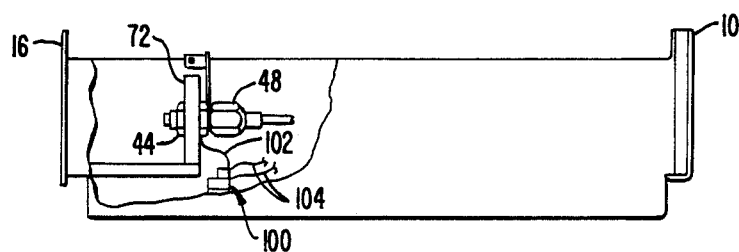
FIG._1C.
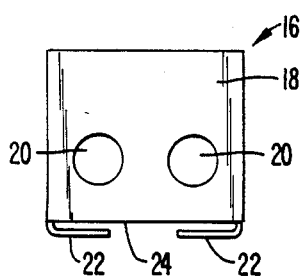
FIG._2A.
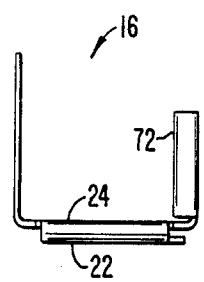
FIG._2B.
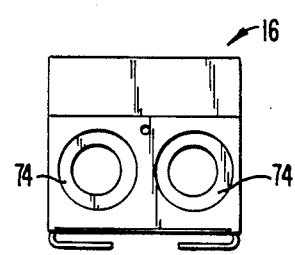
FIG._2C.

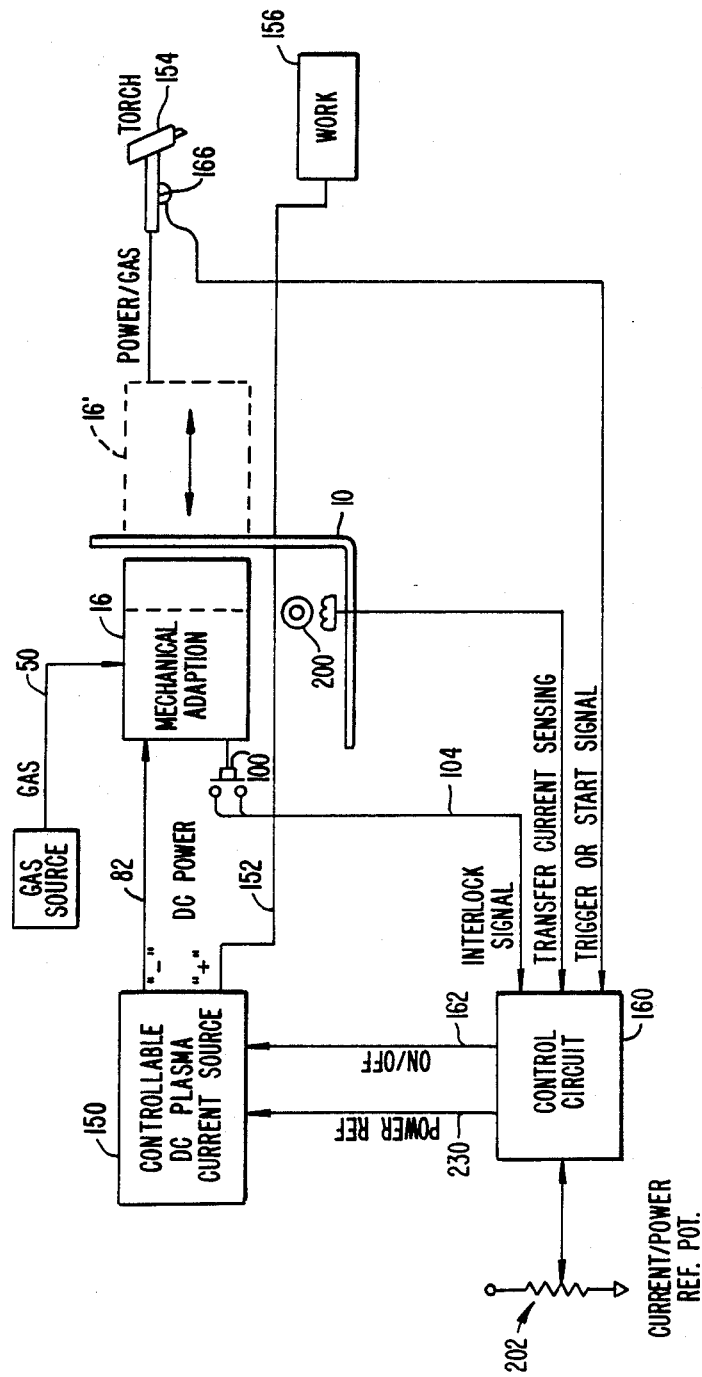
FIG._3.

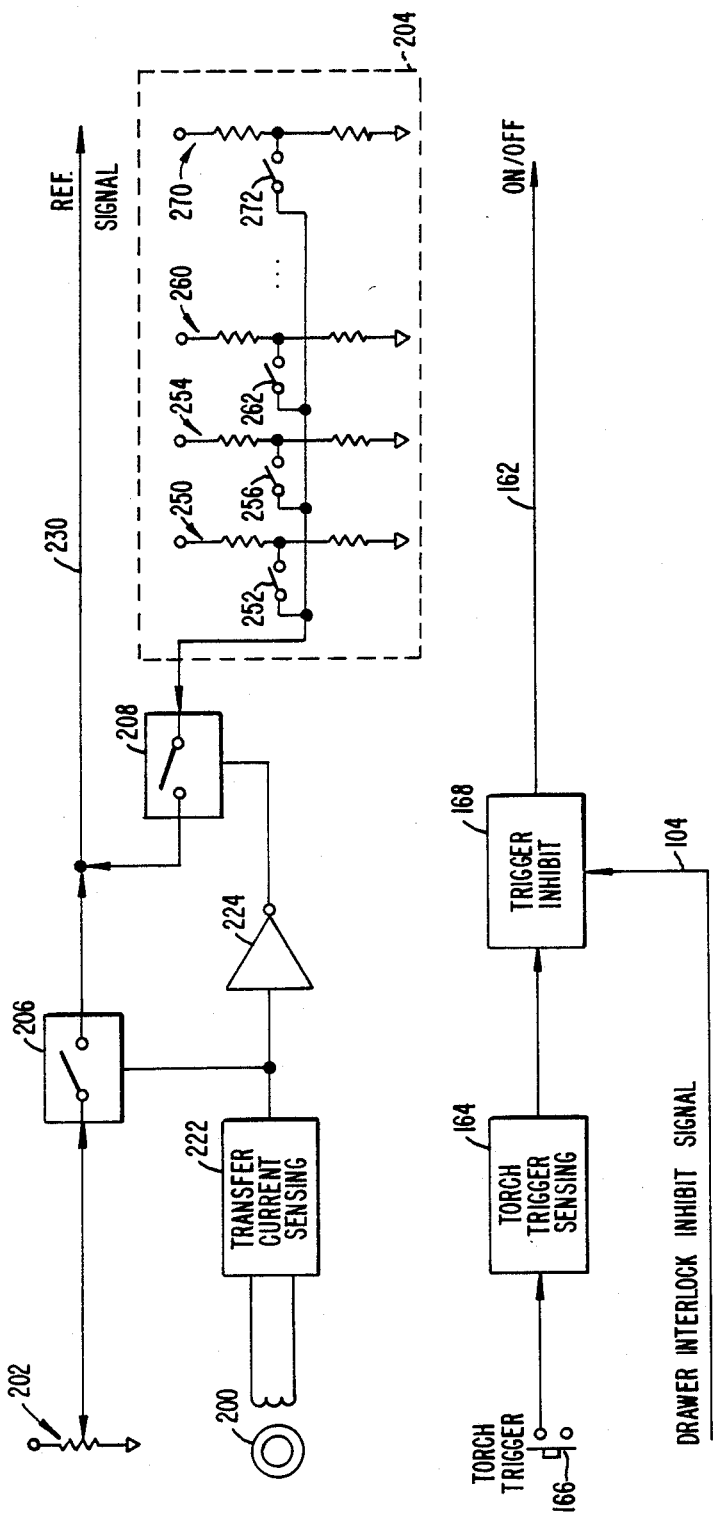
FIG._4.

SYSTEM FOR SUPPLYING POWER TO DIFFERENT CUTTING TORCHES

BACKGROUND OF THE INVENTION

This application relates in general to power supplies and more particularly to a power supply for supplying power to two or more different plasma cutting torches.

Plasma cutting torches require gas and power to operate. The gas normally used in cutting is air or nitrogen. Plasma cutting torches made by different manufacturers will have different characteristics and designs. Thus the power and gas connectors required for torches of different manufacturers may be quite different. Furthermore, the current magnitude required for pilot arcs may be different even for different torches from the same manufacturer. For this reason, a conventional power supply is usually optimized only for one particular type of plasma cutting torch. Thus a conventional power supply optimized only for one type of torch frequently cannot be used for a different type of torch having a different connector design or current requirement for pilot arcs.

SUMMARY OF THE INVENTION

One aspect of the invention is directed towards a plasma cutting power supply for supplying gas and power to one of at least two different cutting torches, where the torches each includes a gas and power connector for receiving gas and power from the power supply. The power supply comprises a housing having an opening, a gas source, and a power source in the housing. The power supply includes a connector plug adapted for connection with a gas and power connector for supplying gas and power from the power and gas sources to a torch, and includes a member connected to the housing so that it is slidable through the opening between a closed position inside the housing and open positions where the member is away from its closed position. The member carries the connector plug. The power supply further includes switch means located in the housing so that when the member is in an open position, the member causes the switch means to generate an interlock inhibit signal, where the switch means generates no interlock inhibit signal when it is in the closed position. The torch generates a triggering signal for starting the torch. The power and gas sources supply a D.C. current and gas to the torch through the connector plug and gas and power connector upon receiving a triggering pulse from the torch. The interlock inhibit signal causes the power source to stop supplying current to the torch even though a triggering signal is generated by the torch. The connector plug is accessible for connecting and disconnecting the gas and power connector by sliding the member to an open position.

Another aspect of the invention is directed towards a plasma cutting power supply for supplying power to one of a plurality of cutting torches, where at least two of the cutting torches have different current requirements for supporting pilot arcs at the torches. The power supply comprises means for supplying D.C. current to the torch for establishing and sustaining a pilot arc at the torch and means for sensing a transferred arc to the workpiece and providing an output to indicate the presence of a transferred arc. The power supply also includes means for providing a first reference signal for controlling the magnitude of the D.C. current supply from the D.C. current supplying means for supporting a transferred arc and means for providing a second reference signal for controlling the magnitude of the D.C. current from the D.C. current supplying means for supporting a pilot arc. The power supply further comprises means responsive to the sensing means output for selecting between the first and second reference signals for controlling the D.C. current supplying means. The second reference signal providing means is adjustable so that the magnitude of the D.C. current supplied by the D.C. current supplying means is adjustable to different values suitable for supporting pilot arcs at the plurality of torches.

BRIEF DESCRIPTION OF THE DRAWINGS

FIG. 1A is an isometric view of a housing for a plasma cutting power supply to illustrate the invention.

FIG. 1B is the top view of the housing of FIG. 1A, a drawer slidably connected to the housing, connector plugs, gas and power connectors and an interlock switch to illustrate the preferred embodiment of the invention.

FIG. 1C is the side view of the power supply components of FIG. 1B.

FIGS. 2A, 2B, 2C are respectively the front, side and rear views of the drawer of FIGS. 1B, 1C.

FIG. 3 is a block diagram of a power supply, a control circuit, a torch and a workpiece to illustrate the preferred embodiment of the invention.

FIG. 4 is a block diagram of the control circuit of FIG. 3.

DETAILED DESCRIPTION OF THE INVENTION

A conventional cutting torch power supply typically includes a housing which has an opening for a torch cable directly from the torch for carrying power and gas to the torch. The cable is connected to a gas source and to a power source inside the power supply through connections made at a panel inside the housing where the panel is spaced apart from the opening. To reach these connections, an operator has to remove the cover or open a door. The connections typically comprise a connector plug carried by the panel, a gas and power connector at the end of the torch cable and a second gas and power connector and a second cable connected to the gas and power sources inside the power supply. The connector plug has a front end facing the opening and a back end facing the interior of the housing. The front end of the connector plug is adapted to be connected to the connector for the torch cable and its back end is adapted to be connected to the second connector in the interior portion of the housing for receiving power and gas from the power and gas sources. In conventional cutting torch power supplies, the gas and power connector for the torch cable as well as the front end of the connector plug are accessible by removing a cover or opening a door, but the rear end of the connector plug and the connector and cable leading to the gas and power sources are not normally accessible since the interior space behind the panel is normally entirely enclosed. For this reason the connector plug cannot be removed without disassembling the entire power supply.

Since a conventional plasma cutting power supply is normally optimized to supply power and gas only to one particular type of torch, there is usually no need to remove the connector plug. Thus, when an operator is performing maintenance work on the power supply, he will need to merely disconnect the gas and power connector for the torch cable from the front end of the connector plug. Hence, if the operator wishes to use the power supply for a different torch requiring a different type of gas and power connector for the torch cable, this is not possible without disassembling the entire power supply in order to change the connector plug. This is undesirable.

This invention is based on the observation that, by providing a sliding member such as a drawer which can be pulled out to protrude from the opening in the housing, the back panel becomes more accessible so that it is easier to connect and disconnect the gas and power connector for the torch cable. In the preferred embodiment, the sliding member can be entirely removed from the housing to expose the rear end of the connector plug so that the plug can be replaced without disassembling the entire power supply assembly. In this manner, the connector plug can also be replaced with one suitable for connection to a different type of torch as desired.

FIG. 1A is an isometric view of a housing for a power supply to illustrate the invention. As shown in FIG. 1A, housing 10 for the power supply has an opening 12 through which a drawer (not shown in FIG. 1A) may be slid in and out for changing connections to the power supply. After the components (not shown) of the power supply are placed inside housing 10 a cover (not shown) cooperates with the housing to enclose the components as well as the drawer. Housing 10 includes a platform member 14 for supporting the drawer.

FIGS. 2A-2C are the front, side and rear views of a drawer 16. The front wall 18 of the drawer has two holes 20 for passage of one or more cables from the torch (not shown). Drawer 16 includes two retaining members 22 connected to the bottom 24 of the drawer. The bottom 24 of the drawer is supported by platform 14 of the housing. Platform 14 is connected to the remainder of housing 10 only at its rear end 14' and there are clearances between platform 14 and side members 32 and 34 of the housing. This permits the retaining members 22 to fit around the sides of platform 14 with platform 14 fitting into the slots defined by the retaining members 22 and the bottom 24 of the drawer. Hence, drawer 16 is slidably connected to platform 14 so that drawer 16 may be slid into and out of opening 12. Even when the drawer is slid partially out of opening 12, retaining members 22 will still cause the drawer to be supported by platform 14 until the drawer is entirely withdrawn from opening 12.

FIGS. 1B, 1C are the top and side views of housing 10, drawer 16, connector plugs 42, 44, gas and power connectors 46, 48, hoses 50 and cables 82 for connection to gas and power sources (not shown) in housing 10. A securing screw 62 is fixed to and protrudes under bottom 24 of drawer 16. Screw 62 fits into a slot 64 in platform 14 to prevent drawer 16 from being entirely withdrawn from opening 12; when screw 62 engages end 64a of slot 64, drawer 16 cannot be withdrawn any further from opening 12. However, when it is desired to withdraw drawer 16 entirely from opening 12 to disconnect the drawer from housing, it is possible to remove screw 62 from the bottom 24 of the drawer.

The rear wall 72 of the drawer also serves as the panel for carrying connector plugs 42, 44. Panel 72, which is made of non-electrically conducting material, has holes 74 therein for engaging and holding the connector plugs. The front ends 42a, 44a of the connector plugs are adapted for connection with gas and power connectors (not shown) that terminate the torch cables (not shown) passing through holes 20 of the front wall of the drawer. The rear ends 42b, 44b of the connector plugs are adapted for connection with gas and power connectors 6, 48 which connect hoses 50 to a gas source (not shown). Power cables 82 supply power from a power source (not shown) in housing 10 to the connector plugs. In such manner gas and power from gas and power sources are supplied through hoses 50, cables 82, connectors 46, 48, connector plugs 42, 44, and gas and power connectors for the torch cable and the torch cables themselves to the cutting torch.

Since the power cables 82 supply power directly to the connector plugs, the connector plugs 42, 44 are at high voltages. This poses a shock hazard to operators. For this reason an interlock microswitch 100 is employed to inhibit power supplied to the connector plugs when drawer 16 is withdrawn from housing 10. The position of drawer 16 is shown in its closed position with respect to housing 10 in FIGS. 1B, 1C. When drawer 16 is in the closed position, back panel 72 is in contact with a leaf spring 102 which deactivates switch 100. However, when drawer 16 is withdrawn only for a short distance from its closed position, back panel 72 is no longer in contact with leaf spring 102 so that switch 100 is activated to supply an inhibit signal to inhibit power supplied through cables 82 to the connector plugs to prevent hazard to operators. Switch 100 is connected to an inhibit circuit described in more detail below through wires 104.

From the above description, it will be evident that the drawer and housing and related structures enable an operator to connect and disconnect a cutting torch from a power supply conveniently and safely. When connection of the front ends 42a, 44a of the connector plugs to the torch cable is desired, an operator simply pulls out the drawer 16 from opening 12. This causes the rear wall 72 to be disengaged from leaf spring 102, so that switch 100 will send signals through wires 104 to cut off the power supplied to the connector plugs 42, 44. This prevents shock hazard. Drawer 16 can be withdrawn until screw 62 engages end 64a of the slot so that the operator can reach the front ends 42a, 44a of the connector plugs conveniently. Where the gas and power connectors of the cutting torch call for a different type of connector plugs, the operator can simply withdraw drawer 16 from opening 12, unscrew screws 62 so that the entire drawer can be removed from housing 10, disconnect connectors 46, 48 from the connector plugs, and replace the connector plugs with connector plugs of a type that is suitable for connection to the particular cutting torch desired. In such manner, the power supply of this application can be used to supply power and gas to cutting torches of many different types using different types of gas and power connectors, without disassembling the entire power supply.

FIG. 3 is a block diagram of a power supply, control circuits, a cutting torch and a workpiece to illustrate the preferred embodiment of the invention. As shown in FIG. 3, a controllable D.C. plasma current source 150 is used to supply power through cables 82 and 152 to a torch 154 and a workpiece 156. Gas is applied through pipeline 50 from a gas source to torch 154. Drawer 16 is shown in solid lines in its closed position and in dotted lines 16' in one of its open positions. Whenever drawer 16 is moved from its closed position by withdrawing it through opening 12, drawer 16 is in one of its many open positions 16'. Microswitch 100 detects whether drawer 16 is in its closed position and sends a signal through wires 104 to a control circuit 160. When switch 100 senses that drawer 16 is in its closed position, no inhibit signal will be sent through wires 104 to control circuit 160 so that power will be supplied by source 150 through cables 82, 152 to the torch and to the workpiece 156. When switch 100 senses that drawer is in one of its open positions 16', it will provide an inhibit signal through wires 104 to control circuits 160; circuits 160 in turn provides a signal through line 162 for turning off source 150.

FIG. 4 is a block diagram of the control circuit 160 of FIG. 3. As shown in FIG. 4, a triggering signal is sent by torch trigger 166 to a torch trigger sensing circuit 164; trigger sensing circuits are known to those skilled in the art for the purpose of turning on and off the power source to the torch. The drawer interlock inhibit signal from wires 104 is supplied to a trigger inhibit circuit 168 (which may simply be a switch) for inhibiting the output of sensing circuit 164. Thus, when switch 100 senses that drawer 16 is in its closed position, switch 100 will supply no inhibit signal through wires 104. In such event, trigger inhibit circuit 168 will simply pass the output of sensing circuit 164 to line 162. When switch 100 senses that drawer 16 is in its open position 16', it will provide an inhibit signal through wires 104 to circuit 168 to inhibit the output of sensing circuit 164. In other words, even though a triggering signal is supplied by trigger 166 and is sensed by sensing circuit 164 for turning on source 150, circuit 168 will inhibit the output of circuit 164 to prevent source 150 from being turned on even in the presence of a triggering signal from trigger 166.

FIGS. 3 and 4 also illustrate another aspect of the invention. Cutting torches from different manufacturers and some cutting torches even from the same manufacturer may have different current requirements for sustaining pilot arcs. This invention is also based on the observation that the current supplied by source 150 can be adjusted to different values suitable for supporting pilot arcs at a number of torches from the same or different manufacturers. Such aspect of the invention will be described below.

In the typical cutting process, an arc is first initiated by means of a high voltage high frequency signal, to initiate a pilot arc between the torch and the torch tip. After the pilot arc is established, the torch is then moved towards a workpiece so that the arc transfers from the torch electrode towards the workpiece. The current supplied to the torch to support a pilot arc is typically different from that required for supporting a transferred arc to the workpiece. The same power source can be used for supplying currents in both phases of the cutting process by employing a sensing circuit for sensing whether the arc has transferred to the workpiece or not. A current transformer 200 placed on cable 152 is used to sense whether a current is flowing to the workpiece 156 to detect whether the arc has already transferred. The current required for supporting a transferred arc is set by a current/power reference potentiometer 202 and the current requirement for the pilot arc is set by circuit 204 in FIG. 4. Output of transformer 200 is then used to turn on or off two switches 206, 208.

The output of transformer 200 is sensed by a current sensing circuit 222. The output of sensing circuit 222 may conveniently be digital signals. When transformer 200 senses a transferred arc, sensing circuit 222 provides a digital signal of one value for turning on switch 206. Such digital signal is inverted by inverter 224 for turning off switch 208. When transformer 200 senses no transferred arc, sensing circuit 222 provides a digital signal of the other value for turning off switch 206 and turning on switch 208 through inverter 224. In such manner, when a transferred arc is sensed, potentiometer 202 supplies a reference signal through line 230 to current source 150 for controlling the current supplied to the torch 154. When transformer 200 senses no transferred arc, circuit 204 will supply a reference signal through line 230 so that source 150 provides a magnitude of current desirable for supporting a pilot arc.

Different torches may require different magnitudes of current for supporting pilot arcs at the torch. Another aspect of the invention is based on the observation that by designing circuit 204 so that the current supplied by the source 150 is adjustable to different values suitable for supporting pilot arcs at a number of different torches, the power supply of this application may be used for supplying power to a number of different torches from the same or different manufacturers. As shown in FIG. 4, this is accomplished by providing a number of voltage divider circuits four of which (250, 254, 260, 270) are shown in FIG. 4. Each voltage divider circuit is connected to switch 208 through a switch; four switches are therefore shown in FIG. 4 (252, 256, 262, 272). Thus, if the cutting torches commonly used by cutting operators requires n different magnitudes of current for supporting pilot arcs, n different voltage divider circuits may be provided in circuit 204, where n is a positive integer. If the operator intends to use one particular type of torch, such as the torch requiring a pilot current level indicated by the voltage divider circuit 260, the operator will simply close switch 262 and leave all the other switches (252, 256, 272) open. Voltage divider circuit 260 then supplies the reference signal through switch 208 and line 230 to set the current level at source 150. After finishing a cutting process with such particular torch, the operator may decide to use a different cutting torch requiring a current level indicated by voltage divider circuit 250 instead. In such event, the operator will open switch 262 and close switch 252. This causes a different reference signal to be supplied through switch 208 and line 230 to source 150 to set a different level of current appropriate for supporting the pilot arc at such different torch. Thus, at least two of the voltage divider circuits will have different resistance ratios for generating different reference signals to source 150 to set different pilot current levels.

The drawer and circuit 204 described above are used only to illustrate the invention. It will be evident that other implementations of the invention are possible; all such alternative implementations and variations in their detail of implementation and method are within the scope of the invention. The scope of the invention is limited only by the scope of the appended claims.

We claim:

1. A plasma cutting power supply for supplying gas and power to one of at least two different cutting torches, said torches each including a gas and power connector for receiving gas and power from the power supply, said power supply comprising:

a housing having an opening;

a gas source;

a power source in the housing;

a connector plug adapted for connection with the gas and power connector for supplying gas and power from the power and gas sources to a torch;

a member connected to the housing so that it is slidable through the opening between a closed position inside the housing and open positions where the member is away from its closed position, said member carrying the connector plug;

switch means located in the housing so that when the member is in an open position, the member causes the switch means to generate an interlock inhibit signal, wherein the switch means generates no interlock inhibit signal when it is in the closed position;

wherein the torch generates a triggering signal for starting the torch, wherein the power and gas sources supply a D.C. current and gas to the torch through the connector plug and gas and power connector upon receiving a triggering signal from the torch, said power source responsive to the interlock inhibit signal to stop supplying current to the torch even though said supplying means has also received a triggering signal from the torch, and wherein the connector plug is accessible for connecting and disconnecting the gas and power connector by sliding the member to an open position.

2. The supply of claim 1, wherein the member is removable from the housing such that the connector plug is accessible for removal and replacement when a different connector plug is required for connection to the gas and power connector of a different type of cutting torch, and wherein such removal and replacement is possible without disassembling the power supply.

3. The supply of claim 1, wherein said member has a rear portion for carrying the connector plug, and wherein said rear portion is contained in the housing and spaced apart from the opening when the member is in the closed position and said rear portion is located so that when the member is slid into the opening until the member is in its closed position, the rear portion is in contact with the switch means for causing the switch means to stop generating the interlock inhibit signal, so that the switch means is also spaced apart from the opening to reduce the probability for accidental contact with the switch means.

* * * * *